Jan. 30, 1968   A. L. MacRITCHIE ET AL   3,365,931
DATA PROCESSING SYSTEM FOR A GAS CHROMATOGRAPH
Filed July 21, 1964

Arthur L. MacRitchie
Robert M. Koros
Inventors

By *Edwin M. Thomas* Attorney

United States Patent Office 3,365,931
Patented Jan. 30, 1968

3,365,931
DATA PROCESSING SYSTEM FOR A
GAS CHROMATOGRAPH
Arthur L. MacRitchie, Morristown, and Robert M. Koros, Highland Park, N.J., assignors to Esso Research and Engineering Company, a corporation of Delaware
Filed July 21, 1964, Ser. No. 384,094
4 Claims. (Cl. 73—23.1)

The present invention relates to a synthetic baseline generator for automatic chromatograph integration system. It has particular application to an automatic data integrating system designed for automatic operation of chromatographic gas analysis. It is applicable also for the control of refining and chemical engineering processes by such analysis.

In gas chromatography, which is a well-known process for separating gaseous mixtures into their respective components and identifying said components both qualitatively and quantitatively, a mixture or sample of gases or vapors to be analyzed is swept through a partitioning column by means of a moving carrier gas. The column, or at least part thereof, is packed or coated interiorally with porous materials. These porous materials are absorbent; they usually have a coating including a high boiling solvent called the partition liquid. Components of gases or vapors in the sample ordinarily have a greater affinity for solution in the partition liquid than does the carrier gas. Hence they are absorbed or absorbed and also released from the liquid film at rates which are different for each component. The process of dissolving or absorption and revaporization or desorption is repeated many times for each component of the sample as it sweeps through the packed column. The time required for a component to traverse the column is its so-called retention time. Since each component usually has a different retention time, gaseous mixtures usually may be efficiently separated into their components.

However, in many cases, there is not a clean and complete separation of all the various components from each other. A given component, for example, may still be tailing off when another one begins to emerge from the separating column. It is desirable also to be able to correct the area of a small peak which emerges on the pretail of a larger peak, as commonly occurs in chromatographs using capillary columns. Recording apparatus based on the Wheatstone-Bridge principle, and sensitive to the differential thermal or heat-transmitting properties of the various component gases, may record overlapping graphs or peaks of the respective components. Quantitatively, the amount of a given component so separated and recorded is proportional to the area under its graph or peak on the recording chart. While area integration is a more accurate way to measure quantitatively, the height of the peak per se is also important. Both area and height may be read inaccurately unless the false base area or height is excluded from the recording. An object of the invention is to accomplish such.

Various attempts have been made in the prior art to reduce the tailing and overlapping of the various curves or peaks which represent components of different gases in chromatographic apparatus. A lagging tail on the graphical representation of one component may often appear as an extended or more gradual slope on the trailing side of the peak than on the advance side, being an indication of a delay in departure or desorption of that particular component from the separation column. When peaks tail or overlap in this or any other manner, and when separate component peaks follow closely, confusion or distortion of the graphic or quantitative record may result. Or, which is more pertinent to the present invention, the curves or the consecutive peaks will not individually or accurately represent either the true areas or the true heights of curves due to the respective components. When data so derived is fed to a computer, as for process control, for example, the whole process may be misdirected.

It is, therefore, a further object of the present invention to effectively and quantitatively separate the component representations on the automatic computer and recorder mechanism, regardless of physical distortion due to overlap of graphic data, due to phenomena of the character described. It will be seen that this is quite a different approach to the problem than that suggested, for example, in a U.S. Patent No. 2,985,007. The latter deals rather with particular procedures of operating the column in an effort to facilitate cleaner separation between the respective peaks. A further object is to establish the valley bottom or nadir between successive peaks due to separate component materials in the products being analyzed, whenever said nadir is above the original base line.

The invention will be more fully understood by reference to the attached drawing, wherein.

Figure 1:
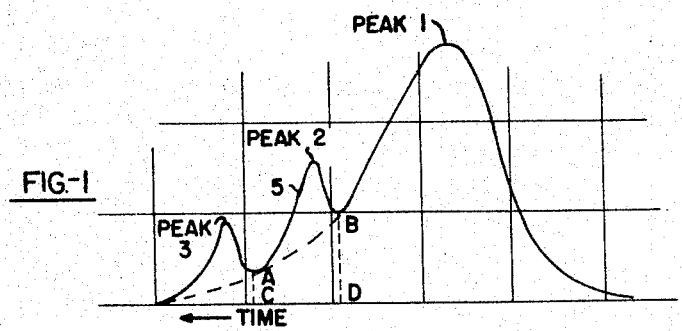
FIGURE 1 shows a typical graph of a multi-component analytical chart taken on the normal recording means associated with a conventional gas chromatograph.

Rferring first to FIGURE 1, a fragmentary chart is shown. This may be considered as moving to the right with respect to the recording device. Elapsed time is indicated leftward. As the chart moves along under the recorder pen, a first gas or vapor component material, which may be a relatively large one volumewise, begins to emerge from the chromatograph. The conventional Wheatstone-Bridge mechanism, not shown, which records the change in conditions, e.g. change in the conductivity of the emergent gas stream, records peak 1. After this component has passed its maximum, but before it has disappeared entirely, a second gas or vapor component begins to appear in the stream. The nadir point is above the original base line. Hence, the recording device indicates peak No. 2. Following this, other peaks such as peak No. 3 may occur. This also may overlap the tailing portion of peak No. 1. Still other peaks, not shown, may come along soon enough to overlap the tail of one or more of the earlier peaks. At any time when a valley bottom or nadir is sensed by the recording mechanism, it is desired that a separate recording will take place. In effect, this establishes a synthetic base line. The equipment is so designed, as will be obvious to those skilled in the art, that new peaks produced after the base line is reached will be separately recorded. If the nadir occurs at the original base line, of course its height will be zero and no correction will be made by the computer.

Obviously, without the separation of the tailing area due to the first curve, if it is assumed, or if it is actually recorded in the mechanism, that peak 2 represents proportionally the volume of its respective components in comparison with peak 1, such representation will be quite inaccurate. The same is true of the area under peak 3. Stated another way, if the area under the curve of the first component were integrated in the usual way, it would be that area under the solid line curve, peak 1, plus the tailing area, below the dotted line, under the two peaks which follow. That is, the integrated area normally recorded for any time unit extends down to the original base line. With respect to peak 2, the area indicated graphically by the figure ABCD properly belongs to component 1 and no part of it to component 2. Hence, if the conventional recorder should transmit data to a computer as to peak 2, it would overstate the true quantity of component 2 by showing a false overall height for the peak and/or a false overall area under peak 2.

The present invention has for its specific purpose the direct elimination or subtraction of the false area ABCD, which is due to tailing of component 1, from that of peak No. 2 in order that the true integrated value of the new peak, that is its height and/or the area under the curve 5 down to the dotted line AB may be properly represented in the recording and computing mechanism. The same procedure, of course, applies to the area and/or the height under the dotted line on which peak 3 is based.

According to the present invention, the error indicated graphically in FIGURE 1 is corrected by detecting the bottom of the valley or the nadir between peaks and by then generating a signal to eliminate the false base. For example, in this case a digital record of the peak area which preceded the valley will be recorded when the recorder indicates the slightest upturn, signalling that point B has been reached. Thus in FIGURE 1, the nadir or bottom of the valley, between components 1 and 2, may be considered the point to separate the data.

When the digital valley sensor in the detecting mechanism detects an increasing slope, as immediately after point B, the counter input gate of the recording mechanism, which is of known type and not described in detail herein, is closed. The area counts, e.g. the means by which data in digital form are recorded and transmitted, will have recorded the area under the first curve to point B. These data are transferred into a storage register, together with the conventional three digit run number, the conventional two digit card number, and the conventional three digit time value. These are recorded in conventional computer apparatus of well-known types which need not be described herein as they form no part of the present invention.

As soon as the information just described has been stored in the mechanism, the signal of point B having been given, the counter is reset automatically to zero. Thereafter, the input gate is opened and the counter starts to accumulate impulses which record, in integration fashion, the next peak area. This has the effect of recording only the area above the dotted line, BA. A suitable means is provided for opening the input gate at the appropriate time. In a typical computer system, the signal to close the gate normally would be used to start a time delay of appropriate value, for example, $15/16$ second. At the end of this delay, the instantaneous value in the counter would be "memorized" in a storage register "on the fly."

When the signal just described is given, the counter readout programming the logic circuits, which are of well known and conventional type, will be altered so that, after the existing register is cleared, the new storage register will also be read out on the card which records the data value. With the additional information so obtained, recorded on each card, the correction for the synthetic base line or base line drift, i.e. the imperfect peak resolution due to the tailing of the first large peak, is made automatically. This can be done by averaging the offset on the card with the offset on the previous card dividing by twice the time delay interval used for measuring the offset and then multiplying the sum by the number of time pulses between the two cards. A similar correction can be made for any peak after the second. The operation can be performed manually, if desired, for a quick look at spot data. The whole computer program can be modified to handle this type of correction automatically.

Figure 2:
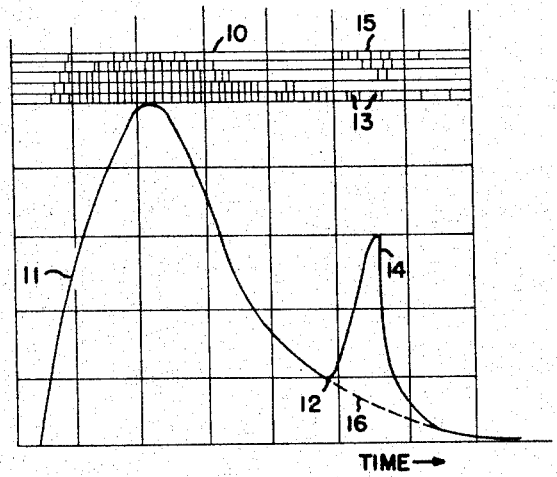
FIGURE 2 represents, graphically, an alternative recording method by which data collection may be made and shown in a digital or visible fashion.

Referring now to FIGURE 2, there is shown a system wherein the digital data are directly plotted, along with the curve itself, for visual evaluation. This system provides for easy and direct numerical reading. A system of this type is based on the combination of analogs obtained from multiple resolution of data. Time is recorded from left to right in this case. The area under the curve for each time interval is indicated graphically by the number of dots in the digital representation at the top of FIGURE 2. Thus area data under the line 11 of FIGURE 2 is transferred electronically or mechanically valuewise to the digital vernier 10.

When the conventional stylus recording the curve 11, under control of the Wheatstone-Bridge circuit of well known type, reaches the valley bottom or nadir at point 12, this reversal of curvature is indicated electrically. The data are recorded digitally in this case on vernier 10, as before. Those data which are due to tailing of the first peak are shown, for purposes of illustration, at the bottom of the vernier, as indicated at 13, whereas those due to the new peak 14 are recorded at 15. In a simple case, the number of dots can be counted, or estimated from the area under dotted line 16, and those at 13 are subtracted from the total to obtain the true area data 15. The result gives data due to the new peak. This can also be done manually. Alternatively, the same recording method as described for FIGURE 1 may be used.

Figure 3:
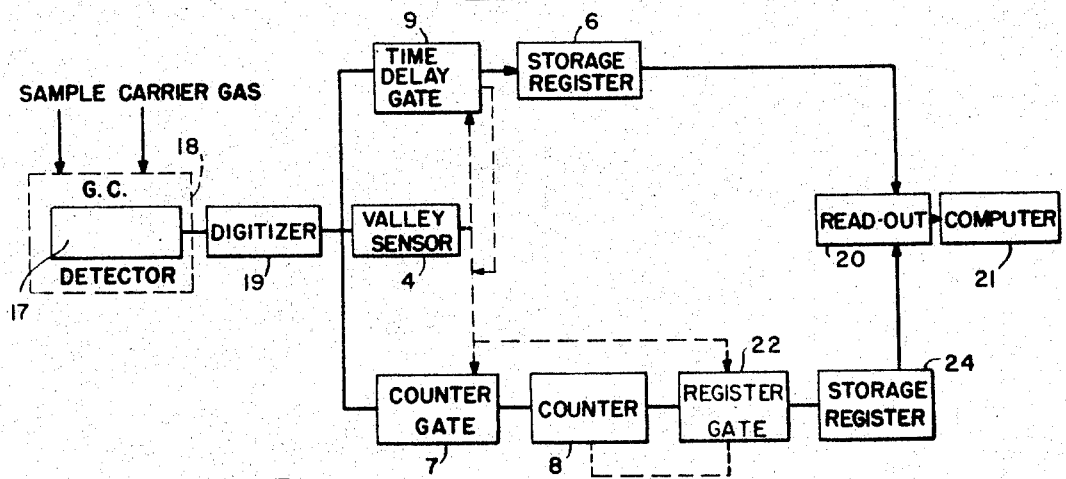
FIGURE 3 shows a diagram of a preferred system.

Referring now to FIGURE 3, an appropriate detector, 17, is provided in a gas partition chromatograph, 18. This detector generates a signal proportional to the concentration of the component eluted from the chromatographic column. This signal is digitized at 19, so that it may be integrated accurately and is then fed to a storage register 6, through a time delay gate, 9, and to a counter 8, through the counter gate, 7. Both gates are actuated by the valley sensor, 4. When the frequency of the signal from the digitizer changes from a zero to a positive value, corresponding to a change from a zero to a positive slope in the signal from the detector, which indicates a valley in the signal before another elution peak, the time delay gate 9 is opened for a set or predetermined amount of time and the net signal is stored in a storage register, 6, ready to be read out through 20 to the computer, 21. This signal, integrated over a known period of time, indicates the amount of offset from the base line at the particular valley and is the information necessary for the computer manipulation to correct the excess area under a small peak due to tailing or pretailing of a large peak. Computer 21 may be of the type manufactured by the International Business Machines Corporation and designated by their Model No. IBM-704. This computer as may readily be appreciated by those skilled in the computer art may be programmed to perform the mathematical operations necessary to obtain the true area due to the respective chromatographic components. At the same time that the time delay gate 9 is actuated, the counter gate 7 is closed. The storage register gate 22 is opened only long enough to clear the integrated signal of the preceding elution peak from the counter into the storage register, 24, from whence it is read out by 20 and into the computer. When the counter 8 is clear, the register gate 22 is closed. The counter gate 7 is opened when the time delay gate closes to allow the signal for the new peak to be integrated.

It will be understood that the counting for the valley offset may be initiated at the time the slope changes from negative to zero (indicating the valley bottom or nadir), rather than waiting for the slope to become positive, although the latter is usually preferred. It will also be understood that various other types of detectors can be used in lieu of those mentioned and described above. For example, detectors need not necessarily be limited to those based on thermal conductivity of the gas or vapor. Any detector that can distinguish between the carrier gas and the eluted component, such as a detector which operates by ionization, by electron capture, or by micro cross-section analysis, may be employed.

Aside from measuring the small side peaks, the accurate measurement of the tail portion of a larger peak is facilitated by the invention. Since tail areas may amount to as much as 10 to 15% or more of the total area of a true peak, this is important.

It will be obvious that the data obtained in this system can be recorded in other ways, the true value of each new peak being obtained by establishing the new base line and deducting data under it. It is intended by the claims which follow to cover various modifications which would suggest themselves to those skilled in the art as broadly as the prior art properly permits.

What is claimed is:

1. An automatic chromatograph system for analyzing gases, vapors and the like, comprising a first means for storing data representing a succession of peaks, a second storage means for storing data representing the nadir point of any valley between the peaks when such valley occurs above a primary base line, a sensor for detecting an increasing slope indicating passage of valley nadir, means for forwarding data, said forwarding means being responsive to said sensor, said forwarding means forwarding data representing the height of said nadir points above said baseline to said second storage means and data representing the area under said peaks to said first storing means after said sensor indicates passage of the nadir, whereby the true value of a secondary peak area which rests in any part on the side slope of a first component peak area, may properly be recorded.

2. In a system of the character described, the combination which includes a gas chromatograph, a detector provided in said chromatograph, a digitizer for digitizing the output from said detector, a valley sensor sensing when the output of said digitizer indicates the bottom of a valley which is higher than the normal base line, which actuates at a transition between a zero slope and a measurable slope, a time delay gate mechanism activated by said sensor, a counter gate mechanism, said counter gate mechanism controlled by said time delay gate and said sensor, a counter for receiving the output from said counter gate, a storage register gate on said counter, and a storage register for receiving the output from said register gate, said counter only being actuated when said time delay gate is closed, a second storage register for receiving the output from the time delay gate and means for clearing said registers.

3. The system of claim 1 further comprising a readout means and a computer means, said readout means clearing the data from said first storing means and said second storing means and forwarding said data to said computer wherein the true value of said secondary peak area is determined.

4. The system of claim 2 further comprising a computer means, said computer means receiving data from said means for clearing said registers.

References Cited

UNITED STATES PATENTS

| | | | |
|---|---|---|---|
| 2,899,258 | 8/1959 | Spracklen | 73—23.1 X |
| 2,951,361 | 9/1960 | Fuller | 73—23.1 |
| 3,049,908 | 8/1962 | Kindred et al. | 73—23.1 |
| 3,098,689 | 7/1963 | Caflisch et al. | 73—23.1 X |
| 3,230,358 | 1/1966 | Davis et al. | 253—183 |

FOREIGN PATENTS 869,936  6/1961  Great Britain.

RICHARD C. QUEISSER, *Primary Examiner.*

JAMES J. GILL, *Examiner.*

C. A. RUEHL, *Assistant Examiner.*